United States Patent [19]
Cho

[11] Patent Number: 5,166,798
[45] Date of Patent: Nov. 24, 1992

[54] COLOR TV WITH SATELLITE BROADCAST RECEIVER INTERNALLY INSTALLED

[75] Inventor: Seong J. Cho, Kyungki-do, Rep. of Korea

[73] Assignee: Samsung Electronics Co., Ltd., Kyungki-do, Rep. of Korea

[21] Appl. No.: 765,592

[22] Filed: Sep. 26, 1991

[30] Foreign Application Priority Data

Dec. 31, 1990 [KR] Rep. of Korea .......... 90-23079

[51] Int. Cl.⁵ ............................................. H04N 7/20
[52] U.S. Cl. ............................. 358/188; 455/189.1
[58] Field of Search .......... 358/188, 181, 197, 198, 358/191.1; 455/189, 188

[56] References Cited

U.S. PATENT DOCUMENTS 5,010,400  4/1991  Oto ............................... 455/189 X
5,014,349  5/1991  Kubo et al. ........................ 455/189
5,068,918  11/1991  Verheijen et al. ............... 358/191.1

Primary Examiner—James J. Groody
Assistant Examiner—Mark R. Powell
Attorney, Agent, or Firm—Robert E. Bushnell

[57] ABSTRACT

A color TV with a satellite broadcast receiver internally installed is disclosed, and the apparatus includes: a tuning section, a satellite tuner, an FM detecting section, a TV tuner, a TV AM detecting section, a base band selecting switch, a low pass filter, a satellite broadcast video signal processing section, a video selecting switch, a video signal processing section, a band pass filter, a pair of audio tuning sections, a pair of audio carrier band width selecting sections, a pair of FM detecting sections, a pair of audio signal processing sections, and an audio selecting switch. A pair of sound signal amplifier sections according to the present invention, the constitution is simplified, and the manufacturing cost is saved.

5 Claims, 3 Drawing Sheets

COLOR TV WITH SATELLITE BROADCAST RECEIVER INTERNALLY INSTALLED

FIELD OF THE INVENTION

The present invention relates to a color television (TV) with a satellite broadcast receiver internally installed, in which functional blocks are commonly used for both a satellite broadcast receiving section for processing video and audio signals after receipt of satellite broadcast signals, and for a TV receiving section for processing video and audio signals after receipt of TV broadcast signals.

BACKGROUND OF THE INVENTION

FIG. 1 illustrates an internal circuit of a color TV with a conventional satellite broadcast receiver internally installed. As shown in this drawing, the internal circuit includes: a satellite broadcast receiving part 100 for outputting video and audio signals after receiving and processing satellite broadcast signals; a TV receiving section 200 for outputting video and audio signals after receiving and processing TV broadcast signals; a video selecting switch 300 for selecting one signal form among the output video signals of the satellite broadcast receiving section 100 and the TV receiving section 200 and the video signal externally input; a video signal processing part 310 for displaying to a cathode ray tube (CRT) after processing the video signals selected by the video selecting switch 300; an audio selecting switch 330 for selecting one signal form among the audio signals of the satellite broadcast receiving section 100 and the TV receiving section 200, and the outer input audio signal; and audio signal amplifiers 340,350 for outputting to speakers 360,370 after amplifying the audio signals selected by the audio selecting switch 330.

The satellite broadcast receiving section 100 includes: a satellite broadcast tuner 110 for selecting a desired channel for the satellite broadcast signals based on the tuning voltage of a satellite broadcast tuning part 115; an a frequency modulation (FM) detecting part 120 for outputting base band signal after FM-detecting the signal of the channel selected by the satellite broadcast tuner 110; a low pass filter 130 for passing only the base band video signals of the FM detecting section 120; a satellite broadcast video signal processing section 140 for processing the video signal passed through the low pass filter 130; a band pass filter 150 for passing only the audio carriers from the base band signals of the FM detecting part 120; audio tuning parts 160,165 for selecting the desired signals after tuning the audio carriers passed through the band pass filter 150; audio bandwidth selecting parts 166,167 for selecting narrow band or wide band in accordance with the bandwidths of the output signals of the audio tuning parts 160,165; satellite broadcast audio FM detecting parts 170,175 for FM-detecting the output signals of the audio bandwidth selecting parts 166,167; and satellite broadcast audio signal processing sections 180,185 for outputting outputs after processing the output signals of the satellite broadcast audio FM detecting parts 170,175.

The TV receiving section 200 includes: a TV tuner 210 for selecting a desired channel for TV broadcast signals based on the tuning voltage of a TV broadcast tuning part 215; a TV amplitude modulation (AM) detecting part 220 for outputting base band signals after AM-detecting the signals of the channel selected by the TV tuner 210; a low pass filter 230 for passing only video signal among the base band signal of the TV AM detecting part 220; a TV broadcast video signal processing part 240 for outputting composite video signals after processing the video signals passed through the low pass filter 230; band pass filters 250,255 for passing only audio carriers among the base band signals of the AM detecting part 220; and TV FM detecting parts 260,265 for FM-detecting the audio carriers of the band pass filters 250,255, and for supplying them to TV audio signal processing parts 270,275.

The color TV with the conventional satellite broadcast receiver internally installed is constituted as described above, and will be described as to its operations below.

First, the satellite broadcast receiving section 100 controls the satellite broadcast tuner 110 based on the tuning voltage of the satellite broadcast tuning part 115 in order to receive the signal of the desired channel among the satellite broadcast signals, and the FM detecting part 120 carries out FM detections to obtain the base band signal.

The base band signal which is outputted from the FM detecting part 120 is supplied to the low pass filter 130 by which the audio carriers are removed, and only the video signals are passed. After passing through the low pass filter 130, the video signal is supplied to the satellite broadcast video signal processing part 140 where the signal undergoes a de-emphasis process and an energy dispersion removal process, before being supplied to the video selecting switch 300 in the form of composite video signals.

The base band signal which is output form the FM detecting part 120 of the satellite broadcast receiving section 100 is supplied to the band pass filter 150 where the video signal is removed, and only the audio carriers are passed through, with the audio carriers being then supplied to the audio tuning parts 160,165 so as for an audio tuning to be carried out.

Under this condition, the reason for carrying out the audio tuning is that the frequency of the audio carriers is different in the satellite broadcast from that of the TV broadcast, and therefore, a separate audio tuning has to be carried out in order to receive the desired audio signals.

Accordingly, the audio carrier signals which have undergone the audio tunings at the audio tuning parts 160,165 are allowed to have wide band width or narrow band width by the audio band width selecting parts 166,167. Then the signals are supplied to the satellite broadcast audio FM detecting parts 170,175 to undergo FM detections, and then, the signals are subjected to an audio de-emphasis process and an audio level compensation, as well as being processed by the satellite audio signal processing parts 180,185 based on the different methods of each country, before being supplied to the audio selecting switch 330.

In the satellite broadcast as in the TV broadcast, audio broadcast signals are sent out based on the one or two-carrier method, and therefore, the audio signals for one or two channels are processed. Meanwhile, in the TV receiving section 200 also, the tuner 210 is controlled based on the tuning voltage of the tuning section 215, and then, the desired channel of the desired band video high frequency, ultra high frequency is selected. Then, an AM detection is carried out by the TV AM detecting part 220, and then a signal consisting of video signals and audio signals is outputted.

If the base band signal which is output from the TV AM detecting part 220 is supplied to the low pass filter 230, the audio carriers are removed, and only the video signal is passed through. If the video signal which has passed through the low pass filter 230 is supplied to the TV broadcast signals processing part 240, the signal is processed into composite video signal which is supplied to the video selecting switch 300.

If the base band signal which is output from the TV AM detecting art 220 is supplied to the band pass filters, the video signals are removed, and only the audio signals pass through. Then the audio carriers which have passed through the band pass filters 250,255 are supplied to the TV FM detecting parts 260,265 to be FM-detected. Then the signals are subjected to a de-emphasis process, and are processed by the TV audio signal processing parts 270,275 based on the different methods of each country, so that audio signals should be output to be supplied to the audio selecting switch 330.

Under this condition, in the TV broadcast also, two-carrier audio signals are sent out, but, in the TV broadcast unlike the satellite broadcast, the carrier frequencies are fixed, and therefore, the audio tunings are not carried out, but the outputs of the band pass filters (as it is) are supplied to the TV FM detecting parts 260,265.

Then the video and audio signals output from the satellite broadcast receiving section 100 and the TV receiving section 200, and the outer input video and audio signals are respectively selected by the video selecting switch 300 and by the audio selecting switch 330, and then, they are supplied through the video signal processing part 310 and the audio signal amplifiers 340,350 to a CRT 320 and to speakers 360,370.

In such a color TV with a conventional satellite broadcast receiver internally installed, the tuning parts 115,215 which supply the tuning voltages are separately provided to both the TV receiving section and the satellite broadcast receiving section. Further, separately provided are also the low pass filters 130,230 for removing audio carriers and for passing only video signals among the base band signal, and the band pass filters 150,250, 255 for removing video signals and for passing only audio signals among the base band signals. Further, the FM detecting parts 170,175,260,265 and the audio signal processing parts 180,185,270,275 are also separately provided.

That is, the functional blocks performing the same functions and operations are separately designed for both the satellite broadcast receiving section and the TV receiving section, and therefore, the circuits are complicated, with the result that the manufacturing cost is increased.

SUMMARY OF THE INVENTION

Therefore, it is the object of the present invention to provide a color TV with a satellite broadcast receiver internally installed, in which functional blocks are provided in such a manner as to be commonly used for both a satellite broadcast receiving section for processing satellite broadcast video and audio signals, and for a TV receiving section for processing TV broadcast video and audio signals.

According to the present invention, there is provided a color TV with a satellite broadcast receiver including a tuning section for outputting tuning voltages; a satellite broadcast tuner for selecting a desired channel for satellite broadcast signals based on the tuning voltage of the tuning part; an FM detecting part for outputting base band signals after FM-detecting the signals of the channel selected by the satellite broadcast tuner; a TV tuner for selecting a desired channel for the TV broadcast signals by means of the tuning voltage of the tuning section; a TV AM detecting part for outputting base band signals after AM-detecting the signals of the channel selected by the TV tuner; a base band selecting switch for selecting base band signals output from the FM detecting part and the TV AM detecting part; a low pass filter for passing only the video signals among the base band signals selected by the base band selecting switch; a satellite broadcast video signal processing part for outputting composite video signals after receipt of the satellite broadcast video signals which have passed through the low pass filter; a video selecting switch for selecting the video output signals of the satellite broadcast video processing part and the low pass filter and outer input signals to supply them to a video signal processing part; a band pass filter for passing only audio carriers among the base band signals selected by the base band selecting switch; a pair of audio tuning parts for tuning the audio carriers of the band pass filter to desired frequencies; a pair of audio band width selecting parts for selecting proper band widths of the output signals of the audio tuning parts; a pair of FM detecting parts for FM-detecting the output signals of the audio band width selecting sections; a pair of audio signal processing parts for processing the output signals of the FM detecting sections; and an audio selecting switch for selecting the signals of the audio signal processing sections and the outer input signals to supply them to audio signal amplifiers.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
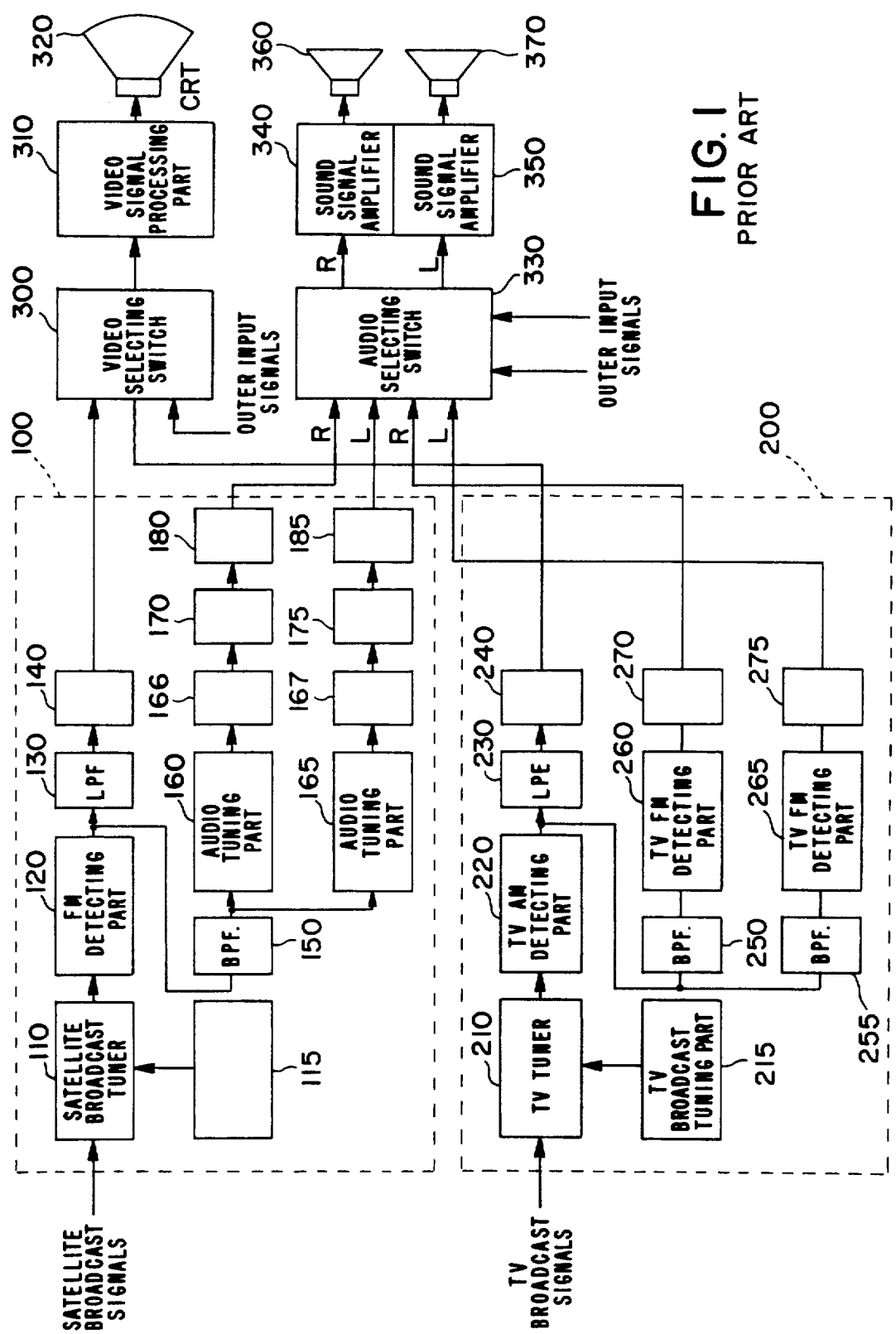
FIG. 1 illustrates the internal circuit of the color TV with the conventional satellite broadcast receiver internally installed.
Figure 2:
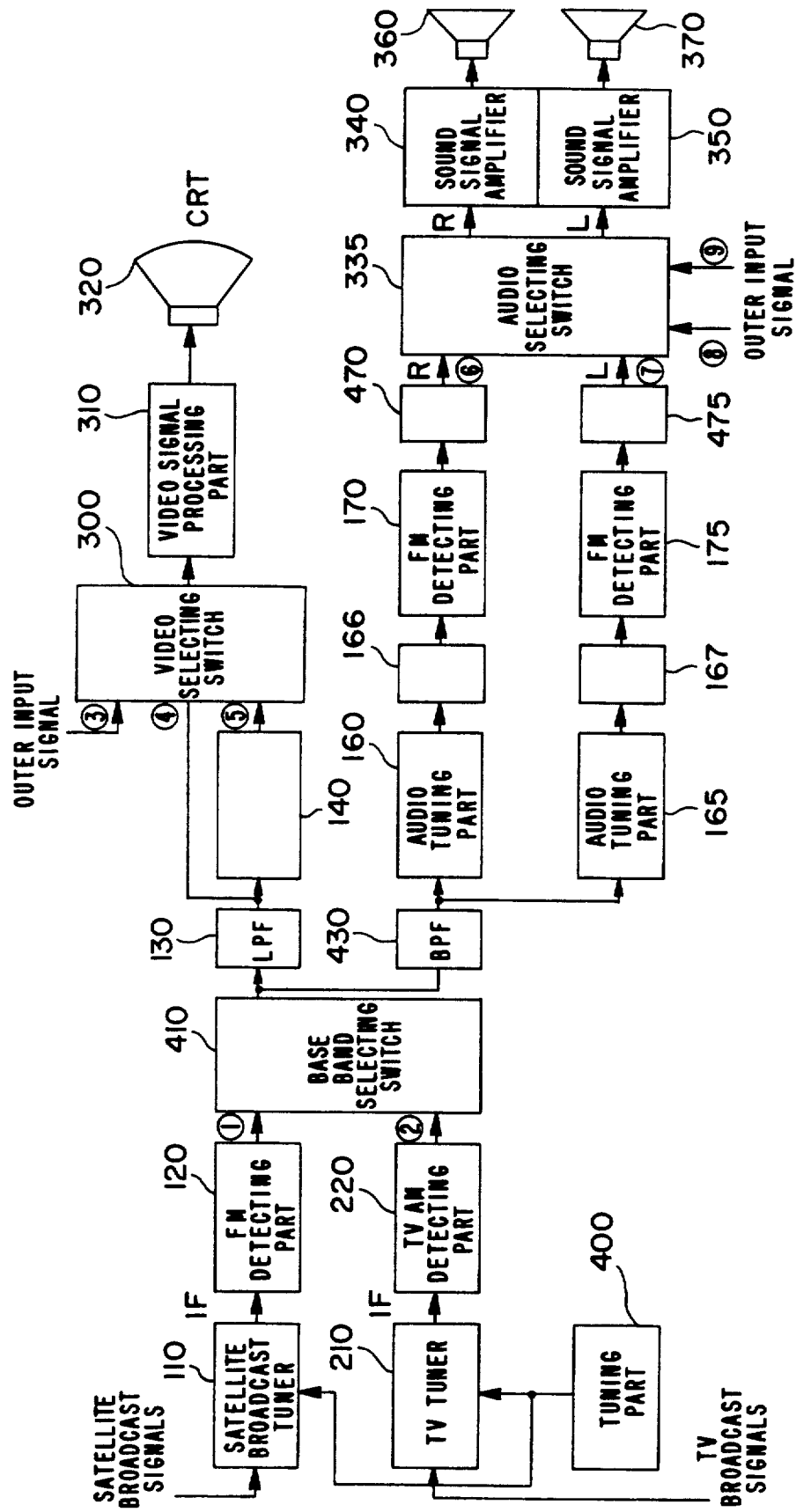
FIG. 2 illustrates the color TV with the satellite broadcast receiver internally installed according to the present invention.

FIG. 2 is a circuital illustration of the color TV with a satellite broadcast receiver internally installed according to the present invention. As shown in this drawing, a satellite broadcast tuner 110 selects the desired channel from among the satellite broadcast signals based on the tuning voltage of a tuning section 400, and this tuner 110 is connected to an FM detecting part 120 in such a manner that the channel signals selected by the satellite broadcast tuner 110 can be FM-detected to output the signals in the form of base band signal.

A TV tuner 210 selects a desired channel from among the TV broadcast signals based on the tuning voltage of the tuning section 400, and the TV tuner 210 is connected to a TV AM detecting part 220 in such a manner that the channel signal selected by the TV tuner 210 should be AM-detected, before outputting them as base band signals.

Further, a base band selecting switch 410 which selects the base band signals output from the FM detecting section 120 and the TV AM detecting part 220 is connected to both the FM detecting part 120 and the TV AM detecting part 220.

The base band selecting switch 410 is connected to both a low pass filter 130 and a band pass filter 430, and the low pass filter 130 removes audio carriers and passes only video signal from among the base band signal which is selected by the base band selecting switch 410. The band pass filter 430 removes video signal and passes only audio carriers from among the base band signal which is selected by the base band selecting switch 410.

Further, the low pass filter 130 is connected to a satellite broadcast video signal processing part 140, in such a manner that the satellite broadcast video signal which has passed through the low pass filter 130 should be output in the form of composite video signals. The low pass filter 130 and the satellite broadcast video signal processing part 140 are connected to a video selecting switch 300, in such a manner that the output of the low pass filter 130, the satellite broadcast video signal processing part 140 and outer input signals can be selected and supplied to a video signal processing section 310.

Meanwhile, the band pass filter 430 is connected to audio tuning parts 160,165 which tune to desired frequencies from among the audio carriers which have passed through the band pass filter 430. The audio tuning parts 160,165 are connected to audio band width selecting parts 166,167 which select proper band widths from the output signals of the audio tuning parts 160,165 in accordance with the proper frequency audio band width.

The audio band width selecting sections 166,167 are connected to FM detecting sections 170,175 which FM-detect the output signals of the audio band width selecting parts 166,167. The FM detecting parts 170,175 are connected to audio signal processing parts 470,475 which process the output signals of the FM detecting parts 170,175.

The audio signal processing sections 470,475 are connected to an audio selecting switch 335 which selects the audio signals of the audio signal processing parts 470,475 and the outer input audio signals, and supplies the selected signals to audio signal amplifiers 340,350.

The video signal processing part 310 and the audio signal amplifiers 340,350 are connected to a CRT 320 and speakers 360,370, in such a manner that the video and audio signals which are outputted from the video signal processing part 310 and the audio signal amplifiers 340,350 should be visually displayed to a user.

The apparatus of the present invention constituted as above will now be described as to its operations.

First, if the signal of 1 GHz which is the satellite broadcasting frequency is inputted, then the satellite broadcast tuner 110 selects the desired channel in accordance with the tuning voltage supplied by the tuning part 400. The channel signal which is selected by the satellite broadcast tuner 110 is FM-detected by the FM detecting part 120, and the base band signal is supplied to the base band selecting switch 410.

Under this condition, if [1] is selected by the base band selecting switch 410, the base band signal of the FM detecting part 120 is supplied to both the low pass filter 130 and the band pass filter 430. Thus, the low pass filter 130 removes audio carriers and passes only the video signal, while the band pass filter 430 removes the video signal and passes only audio carriers.

The video signal which has passed through the low pass filter 130 is supplied in the form of composite video signals to the video selecting switch 300, after passing through the video signal processing part 140, including a video emphasis and energy dispersion removing circuit. Under this condition, if [5] is selected by the video selecting switch 300, the composite video signals of the satellite broadcast video signal processing part 140 are processed by the video signal processing part 310, and then, are displayed on the CRT 320.

Meanwhile, the band pass filter 430 removes the video signal, and passes only audio carriers of 5-8.5 MHz, while the audio carriers which are output from the band pass filter 430 are supplied to the audio tuning parts 160,165 where a tuning is made to the desired audio frequencies.

The audio frequencies which are tuned by the audio tuning parts 160,165 pass through the audio band width selecting parts 166,167 which select proper band width. Then the signals are FM-detected by the FM detecting parts 170,175, and then, are supplied to the audio signal processing parts 470,475 where the signals are subjected to audio level compensations, and are processed based on the different methods of each country, before being supplied to the audio selecting switch 335.

Under this condition, in order to tune two carriers based on the two-carrier method, the two left and right audio tuning parts 160,165 are used.

If the audio selecting switch 335 is set to [6],[7], the audio signals which are processed by the audio signal processing parts 470,475 are output through the audio signal amplifiers 340,350 to the speakers 360,370.

Thus the satellite broadcast receiving operation is carried out in the manner described above. Now the TV broadcast receiving operation will be described.

If TV broadcast signals are input, the desired channel is selected by the TV tuner 210 in accordance with the tuning voltage supplied by the tuning part 400. Then, the channel signal which is selected by the tuner 210 is AM-detected by the TV AM detecting part 220, and the base band signal is supplied to the base band selecting switch 410.

Under this condition if [2] is selected by the base band selecting switch 410, the base band signal of the TV AM detecting part 220 is supplied to both the low pass filter 130 and to the band pass filter 430.

Thus, the low pass filter 130 removes audio carriers and outputs only the video signal which is then supplied to the video selecting switch 300. Under this condition, the video selecting switch 300 selects [4], so that the video signal should be processed by the video signal processing part 310. Then, the processed signal is displayed to the CRT 320, so that the user should be able to watch the TV.

Meanwhile, the band pass filter 430 removes the video signal and passes only audio carriers, and the audio carriers which have passed through the band pass filter 430 are supplied to the FM detecting parts 170,175, after passing through the audio tuning parts 160,165 and the audio band width selecting parts 166,167 which select proper band width.

Under this condition, the audio tuning parts 160,165 make it possible that TV broadcast audio carriers are selected from the audio carrier outputs of the band pass filter 430. That is, if the number of the audio carriers is one, then one of the audio tuning parts 160,165, or both of them can be used.

Then, the audio signals are FM detected by the FM detecting parts 170,175, and processed by the audio signal processing parts 470,475, before being inputted into the audio selecting switch 335. Here, audio selecting switch 335 selects [6],[7], so that the audio signals which are processed by the audio signal processing parts 470,475 should be supplied through the audio signal amplifiers 340,350 to the speakers 360,370.

The TV broadcast receiving operation is carried out based on the above described process.

Meanwhile, in case that input signals from an external source exist as in the case of video cassette recorder (VCR) [3] is selected by the video selecting switch 300, and [8],[9] are selected by the audio selecting switch 335. Then, the externally inputted signals like in a VCR are output through the CRT 320 and the speakers 360,370, after passing through the video signal processing part 310 and the audio signal amplifiers 340,350.

The selecting operations of the audio selecting switch 335, the video selecting switch 300 and the base band selecting switch 410 can be summarized as shown in the table below.

TABLE

|  | Audio selecting switch | Video selecting switch | Base band selecting switch |
| --- | --- | --- | --- |
| TV mode | 6,7 | 4 | 2 |
| Satellite broadcast mode | 6,7 | 5 | 1 |
| External input mode | 8,9 | 3 | X |

Figure 3:
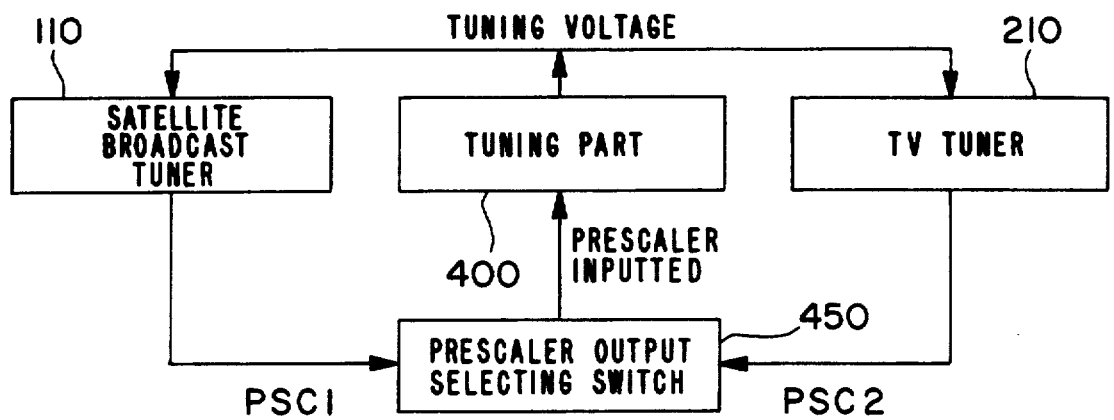
FIG. 3 illustrates the connections between the satellite broadcast tuner and the TV tuner of the tuning part of FIG. 2.

According to the present invention, if the satellite broadcast tuner 110 and the TV tuner 210 are to be tuned by means of a single tuning part 400, the connections should be made as shown in FIG. 3.

That is, the tuning voltage of the tuning part 400 is supplied to both the satellite broadcast tuner 110 and the TV tuner 210, and a prescaler output PSC1 of the satellite broadcast tuner 110 and a prescaler output PSC2 of the TV tuner 210 are supplied through a prescaler output selecting switch 450 to the tuning part 400, so that a phase locked loop should be formed, thereby making it possible to select the desired channel. In the above, the prescaler outputs PSC1,PSC2 are the signals which are formed by dividing and outputting the VCO (voltage controlled oscillator) frequencies of the satellite broadcast tuner 110 and the TV tuner 210.

If the prescaler output PSC1 of the satellite broadcast tuner 110 is selected by the prescaler output selecting switch 450, the tuning part 400 is set to a satellite broadcast tuning mode, while, if the prescaler output PSC2 of the TV broadcast tuner 210 is selected by the prescaler output selecting switch 450, then the tuning part 400 is set to a TV tuning mode.

Figure 4:
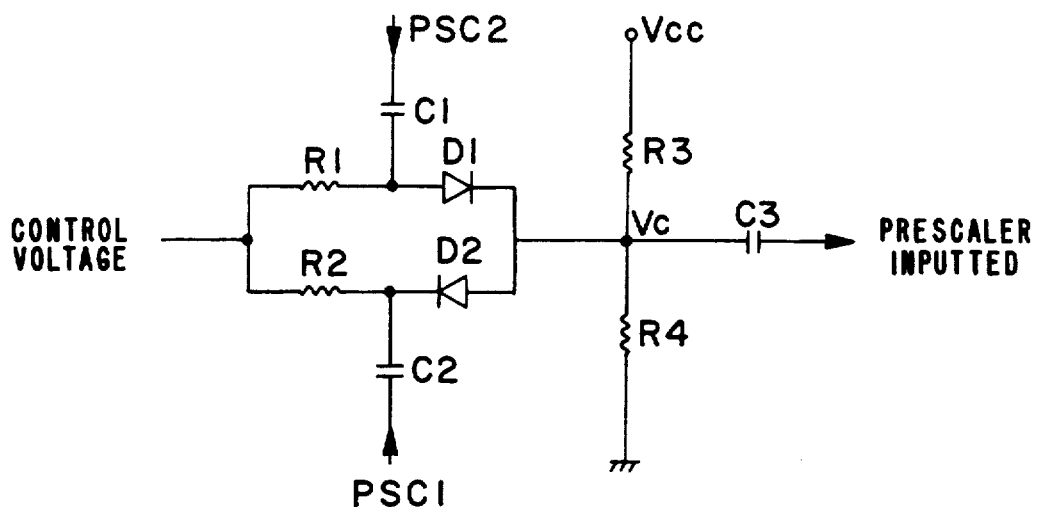
FIG. 4 illustrates in detail the prescaler output selecting switch of FIG. 3.

A detailed circuit of the prescaler output selecting switch 450 which is operated in the above described manner is described in FIG. 4.

As shown in this drawing, the prescaler outputs PSC1,PSC2 of the satellite broadcast tuner 110 and the TV tuner 210, which are supplied through DC blocking condensers C1,C2 are output through diodes D1,D2 which are driven by the control voltage level. One of the prescalers PSC1,PSC2, which is output through one of the diodes D1,D2, is supplied through a DC blocking condenser C3 to the tuning part 400.

If it is assumed that the resistances of resistors R3,R4 are R3=R4 then the relation VC=1/2Vcc is established. Therefore, if the control voltage is supplied with the level of Vcc, the diode D1 is turned on, and the diode D2 is turned off, with the result that the prescaler output PSC2 of the TV tuner 210 is supplied through the condenser C3 to the tuning part 400. On the other hand, if the control voltage is supplied with a level of 0, the diode D2 is turned on, and the diode D1 is turned off, so that the prescaler output PSC1 of the satellite broadcast tuner 110 is supplied through the condenser C3 to the tuning part 400.

Here, the prescaler output selecting switch 450 is constituted in the form of an analogue switch, so that the prescaler outputs PSC1,PSC2 can be selected.

According to the present invention as described above, the color TV including an internal satellite broadcast receiver uses one tuning sections for the satellite broadcast receiving sections and the TV receiving section. The FM detecting section and the audio signal processing section of the TV receiving section are matched with the FM detecting section and audio signal processing section of the satellite broadcast receiving section, with the result that functional blocks such as the band pass filter, the FM detecting section and the audio signal processing section of the TV receiving section are reduced. Thus the functional blocks which can be used in common forms are made to be commonly used, so that unnecessary blocks can be eliminated, thereby enabling to simplify the constitution and to save the manufacturing cost.

What is claimed is:

1. A color television with a satellite broadcast receiver internally installed, comprising:

a tuning part for generating tuning voltages;

a satellite broadcast tuner for selecting a desired channel from among satellite broadcast signals based on the tuning voltage of said tuning part;

a frequency modulation detecting part for outputting base band signals after frequency modulation detecting the channel signal selected by said satellite broadcast tuner;

a television tuner for selecting a desired channel from television broadcast signals based on the tuning voltage of said tuning section;

a television amplitude modulation detecting part of outputting base band signal after amplitude modulation detecting the channel signal selected by said television tuner;

a base band selecting switch for selecting base band signals output from said frequency modulation detecting part and said television amplitude modulation detecting part;

a low pass filter for passing only a video signal among the base band signals selected by said base band selecting switch;

a satellite broadcast video signal processing part for processing the satellite broadcast video signal from said low pass filter to output in the form of a composite video signal;

a video selecting switch for selecting the video signal outputs of said satellite broadcast video signal processing part, and said low pass filter and outer input signal, and applying that to a video signal processing part;

a band pass filter for passing only audio carriers among the base band signal selected by said base band selecting switch;

audio tuning parts for tuning the audio carriers to a desired frequency from among the audio carriers of said band pass filter;

audio band width selecting parts for selecting proper band width from the output signals of said audio tuning parts;

frequency modulation detecting parts for frequency modulation detecting the output signals of said audio band width selecting parts;

audio signal processing parts for processing the output signals of said frequency modulation detecting parts; and an audio selecting switch for selecting the output signals of said audio signal processing sections and outer input signals, and for supplying that to a sound signal amplifier.

2. The color television with a satellite broadcast receiver internally installed as claimed in claim 1, wherein said tuning section which supplies the tuning voltages to the satellite broadcast tuner and to the television tuner includes a prescaler output selecting switch for selecting a prescaler output of said satellite broadcast tuner and a prescaler output of said television tuner and supplying that to said tuning part.

3. The color television with a satellite broadcast receiver internally installed as claimed in claim 2, wherein said prescaler output selecting switch comprises:

condensers for blocking the direct current components of said prescaler outputs of said satellite broadcast tuner and said television tuner;

diodes for selectively passing said prescaler outputs passed through said condensers in accordance with the control voltage level;

a condenser for blocking the direct current component of Vc.

4. The color television with a satellite broadcast receiver internally installed as claimed in claim 1, wherein said audio tuning parts are automatically preset to the television audio carrier frequency for the case of television signals.

5. The color television with a satellite broadcast receiver internally installed as claimed in claim 1, wherein said band pass filter passes audio carriers of satellite broadcast signals and audio carriers of television signals.

* * * * *

UNITED STATES PATENT AND TRADEMARK OFFICE
CERTIFICATE OF CORRECTION

PATENT NO. : 5,166,798
DATED : November 24, 1992
INVENTOR(S) : Seong Jae Cho

It is certified that error appears in the above-indentified patent and that said Letters Patent is hereby corrected as shown below:

IN THE TITLE PAGE

Inventor, [75], Change "Seong J. Cho" to --Seong Jae Cho-- .

Column 1, Line 24, Change "form" to --from-- ;

Column 2, Line 33, Change "form" to --from-- ;

Column 3, Line 10, Change "art" to --part-- ;

Column 8, line 46, After "part", Change "of" to --for--.

Signed and Sealed this

Fourteenth Day of November, 1995

Attest:

BRUCE LEHMAN

*Attesting Officer*  *Commissioner of Patents and Trademarks*